Dec. 19, 1933.    J. C. JENKINS    1,940,353
METHOD OF REDUCING FROZEN LIQUID
Filed Sept. 10, 1929    4 Sheets-Sheet 1
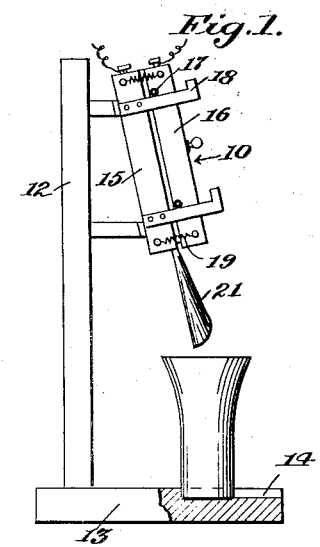
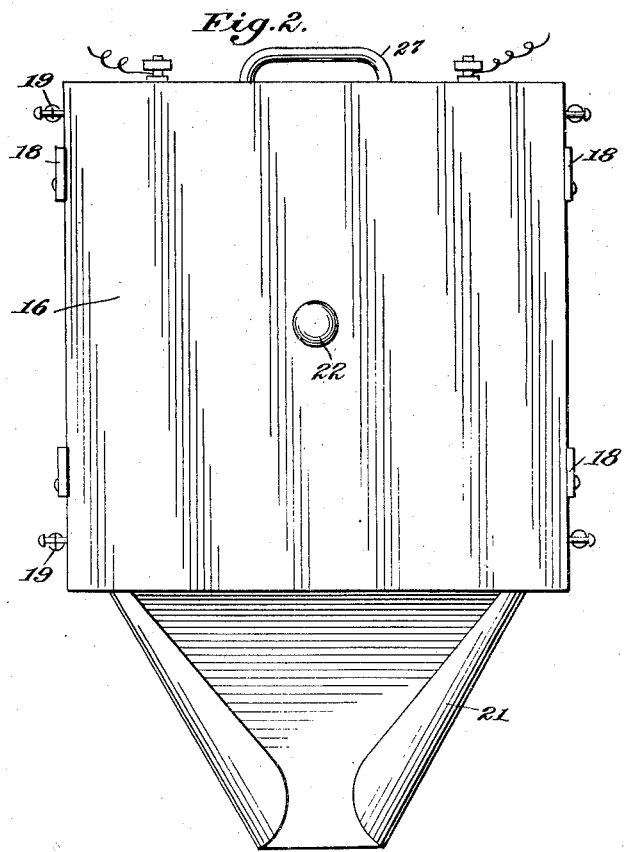
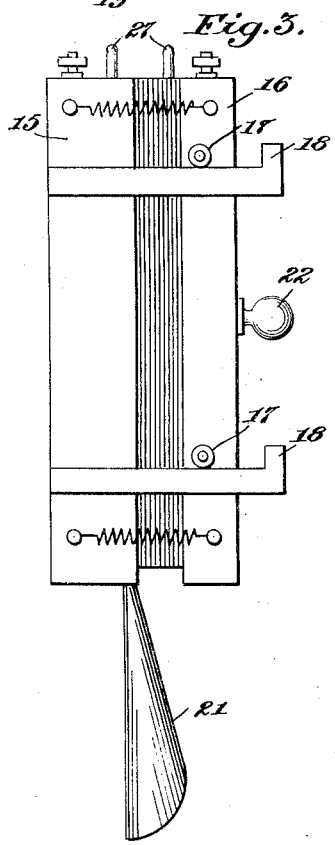
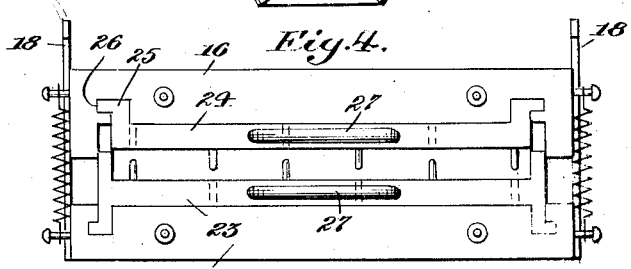
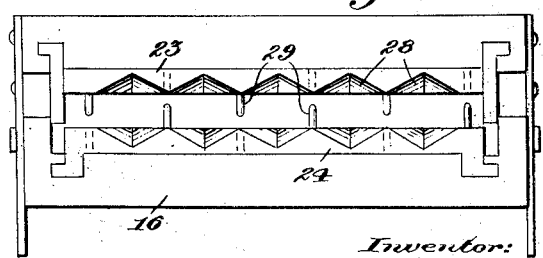
Inventor:
Joe C. Jenkins,
Morrison, Kennedy & Campbell
Att'ys.

Dec. 19, 1933. J. C. JENKINS 1,940,353
METHOD OF REDUCING FROZEN LIQUID
Filed Sept. 10, 1929 4 Sheets-Sheet 2
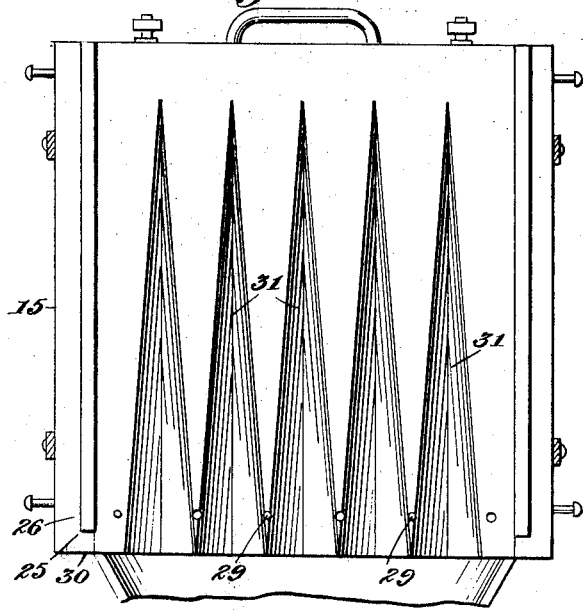
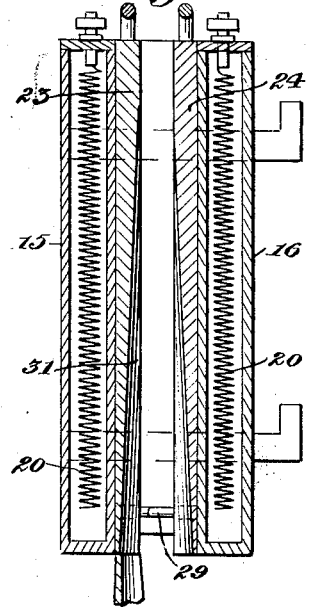
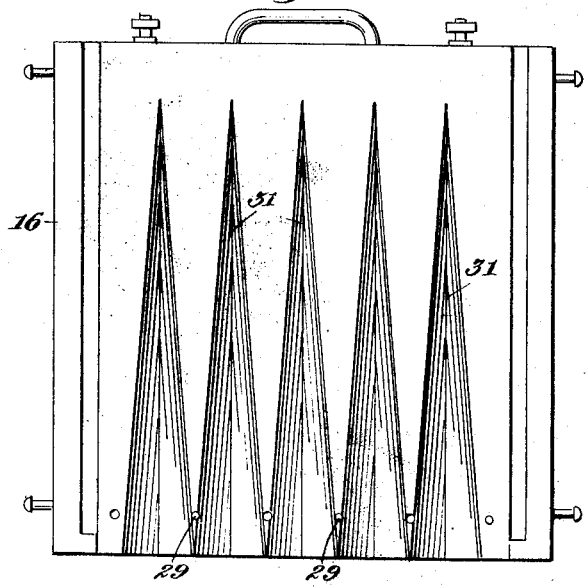
Inventor:
Joe C. Jenkins,
Morrison, Kennedy & Campbell
Att'ys.

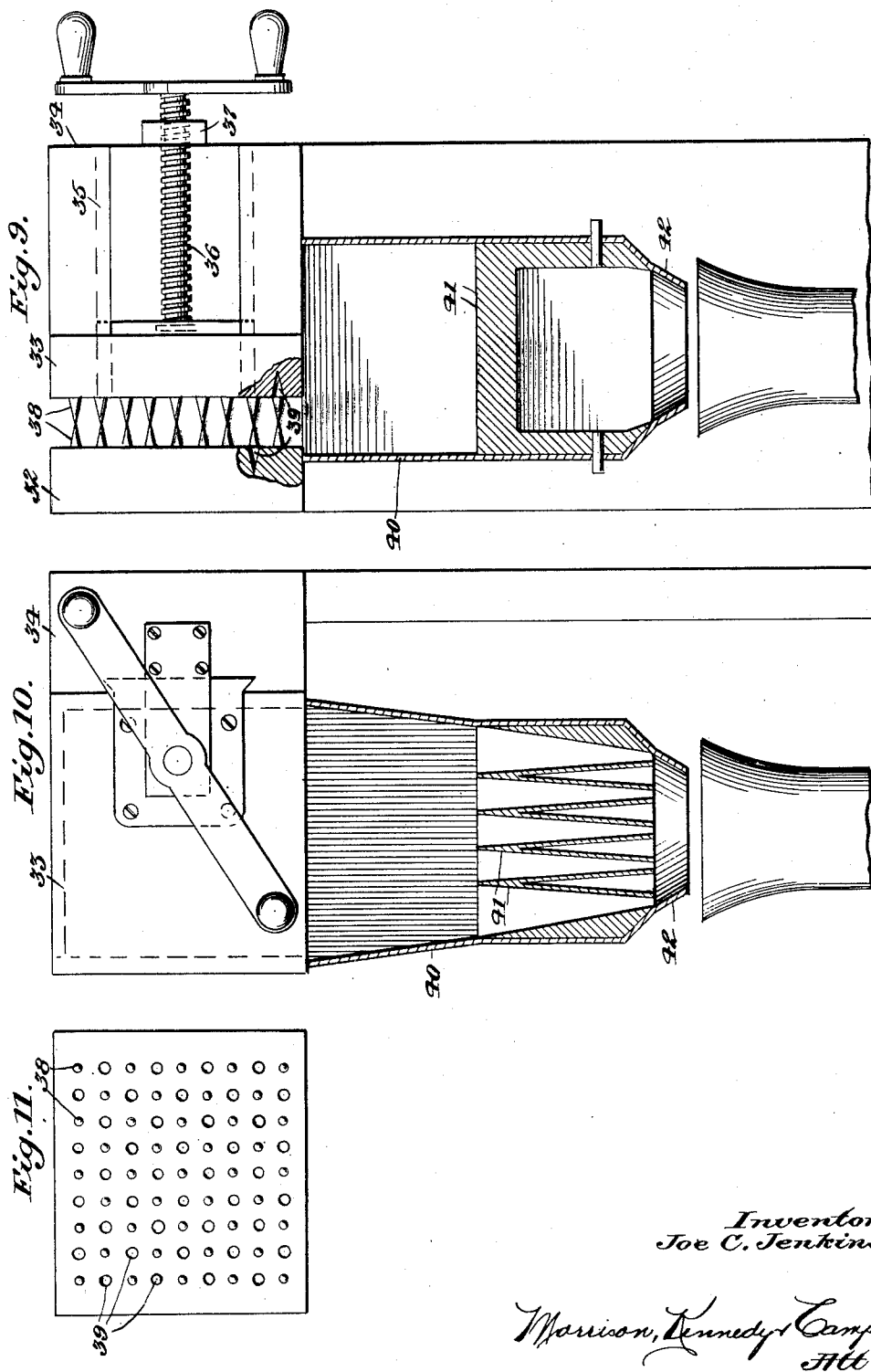

Dec. 19, 1933.  J. C. JENKINS  1,940,353
METHOD OF REDUCING FROZEN LIQUID
Filed Sept. 10, 1929  4 Sheets-Sheet 4
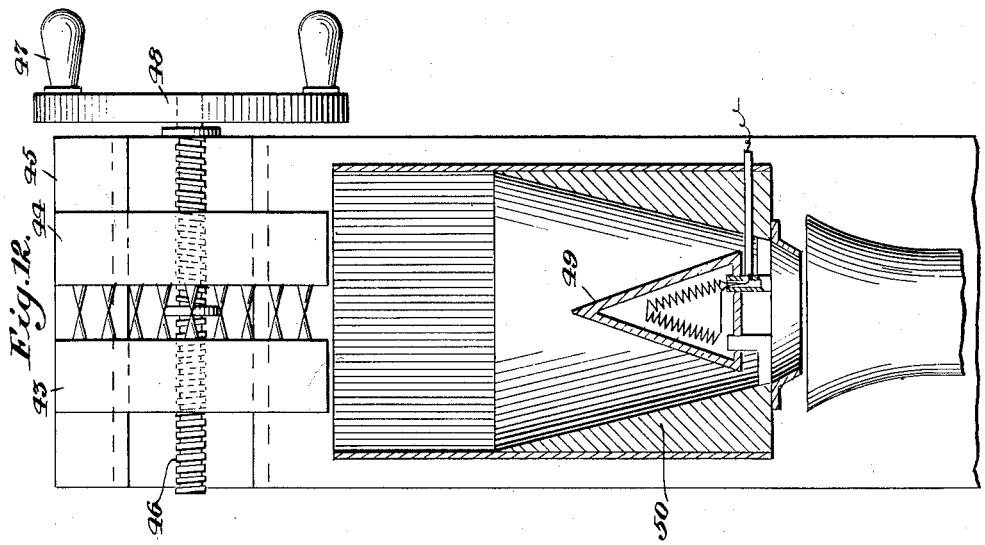
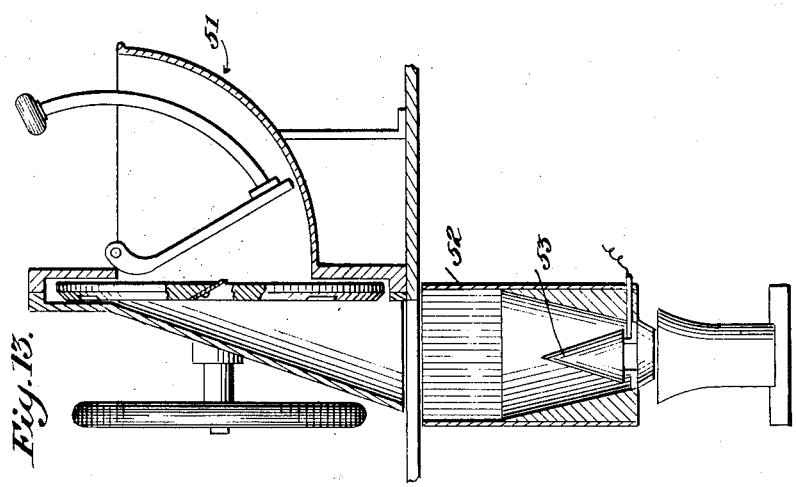
Inventor:
Joe C. Jenkins,
Morrison, Kennedy & Campbell
Attys.

Patented Dec. 19, 1933

1,940,353

UNITED STATES PATENT OFFICE 1,940,353

METHOD OF REDUCING FROZEN LIQUID

Joe C. Jenkins, Winter Haven, Fla.

Application September 10, 1929
Serial No. 391,685

9 Claims. (Cl. 99—11)

This invention relates to improvements in method and apparatus for reducing frozen juices.

The broad object of my invention is to provide a method for reducing to their natural state, ready for use, orange juice, grapefruit juice, fresh grape juice, milk and any other fruit, vegetable, or animal derivative after having been frozen by any of a number of known processes into solid form of any shape and size for the purpose of preserving them from spoiling over an indefinitely extended period, so that the ultimate consumer is assured of receiving the goods in the same condition as when they were first produced.

I am aware that various methods have been devised for freezing perishable liquid foodstuffs, such as milk and fruit juices, into solid form for the purpose of preserving them so that they may be kept indefinitely without in any way deteriorating when stored in a properly refrigerated container. Such treatment is of great value when it is necessary to transport the food-stuffs to points distant from the source of supply, and in cases where the goods must be kept for a long period before they are to be used. Furthermore, since many disadvantages are encountered in handling liquids, molding fruit juices, milk and the like by freezing into blocks of any convenient size and shape which may be compactly arranged in convenient containers that may be readily handled, the present invention will be recognized as a considerable advance in the art. The processes above referred to are well adapted to mold the liquid foodstuffs into large cakes weighing several hundred pounds when it is desirable to preserve the liquids in bulk, and likewise to mold individual small cakes or cubes which when melted are calculated to produce a single glass of liquid. This latter form is suitable for use in the home, in restaurants and in soda fountains.

While successful methods of freezing and handling liquids such as fruit juices have been evolved, I am not aware that any method or apparatus has been devised for reducing the juices to their liquid state in a quick and convenient manner, so as to make the use of such freezing methods commercially practicable. Inasmuch as the demand for orange juice, grapefruit juice, fresh grape juice, and fermenting grapejuice with the alcoholic content removed used for lawfully making wine in the home, and like products, is steadily on the increase, it will be appreciated that when the producer can let his product ripen on the tree or vine, immediately thereafter extract the juice, freeze it into solid form, sealing in the natural flavor and aroma, and ship his product to market with no danger of deterioration before it reaches the market, he will be able to avoid tremendous losses and command a better price for his product.

Recognizing the need of a process for reducing the frozen juices to the natural state, it is my primary object to provide a method of reducing the juices in so short a time that the juices may be preserved in their frozen state until they are required for use, so that when they are reduced they may be used before any deterioration has occurred.

It is my further object to provide a method of reducing frozen juices which will result in liquefaction of the juices without materially raising their temperature so that they may be immediately served as a chilled drink without the necessity of adding ice, which would upon melting dilute the juices.

It is a still further object of my invention to provide a method of reducing frozen juices wherein the solid state of the juices may be changed to a frozen mush without reducing the juices to the liquid state, said frozen mush being well adapted to be used as a substitute for sherbet.

It is another object of my invention to provide a method adapted to reduce only a portion of a cake of frozen juices whereby it is possible to liquefy a portion of the juices and to introduce the unliquefied portion into the liquefied juices for the purpose of compensating them for the heat absorbed in changing from solid to liquid state, and to keep them in a chilled condition.

Specifically, my method contemplates subjecting the frozen juices to heat of an intensity sufficient to cause rapid reduction. In order to hasten reduction, where necessary or desirable, my method may involve comminution of the frozen juices, either as a preliminary step to the heat treatment or concurrently therewith.

To carrying out my method I have devised an apparatus designed to reduce the frozen juices to a liquid or to a mush with the utmost dispatch. Essentially it comprises heating means, means for supporting frozen juices in contact therewith, and preferably, comminuting means cooperating with the heating means. In this specification and in the accompanying claims where I have used the term "juices", I intend to include fruit juices, vegetable extracts, milk or any other animal derivative. Where I have used the term "frozen" in connection with the term "juices", I refer, generally, to juices which are existing as a solid mass due to the absence of heat ordinarily absorbed in the juices when they are in their natural liquid state; on some occasions, however, as will be obvious from the context, I have used the term in reference to juices existing as a comminuted solid. By the term "comminute" in connection with the term "frozen juices", I intend to refer to the breaking up of the solidified mass of frozen juices into small particles without the occurrence of liquefaction. By the term "comminuting means" I refer to any means adapted to break up the solidified mass of juices into small particles, such means including shavers, grinders, crushers and any other instrumentality adapted to shatter a solid mass.

It is to be understood that the method herein set forth is susceptible of a wide range of uses other than that of reducing frozen juices, and that the apparatus described below and shown in the accompanying drawings is capable of a considerable range of modification and equivalency. I therefore do not intend to limit myself to the method employed in connection with the reduction of any particular frozen liquid, nor to the specific features of the apparatus and its modifications shown in the accompanying drawings, inasmuch as they are merely illustrative of my broad inventive concept.

In these drawings:

Fig. 1 is a view in side elevation showing a preferred form of apparatus which includes a pair of oppositely disposed heated plates adapted to receive a block of frozen juice between their adjacent faces;

Fig. 2 is a plan view of the outer side of one of the heating plates shown in Fig. 1, and also of the drain associated with the second heated plate, which is disposed opposite the first plate, adapted to carry off the juices as reduced.

Fig. 3 is a view in side elevation similar to Fig. 1, showing the oppositely disposed heated plates, and means of supporting one plate with respect to the other so that they may be separated for the purpose of introducing a cake of frozen juice between their adjacent faces.

Fig. 4 is a top end view of the heated plates, showing the construction of the removable inner faces of said plates and the means for urging them together.

Fig. 5 is a bottom end view of the plates, showing the channels in the removable faces of the plates for carrying off the juices as they are reduced, and further showing pins associated with the faces for supporting the frozen juices during reduction.

Figs. 6 and 7 are corresponding views of the inner surfaces of the heated plates, showing the removable faces and the shape of the channels in the faces for removing the juices as reduced.

Fig. 8 is a view in cross section showing how the electrical heating elements may be mounted in the main body of the plates, and further showing the contour of the channels in the removable inner faces of the plates for conducting away the reduced juices.

Fig. 9 is a view in front sectional elevation of a modified form of apparatus wherein the heating means and the comminuting means are separate, the heating means being in the form of wedge-shaped plates located below the comminuting means, which here consists of a pair of crushing plates with a crank-controlled screw for urging one plate towards the other.

Fig. 10 is a side sectional elevation of the apparatus shown in Fig. 9, showing the construction of the heating plates and also the means of mounting the sliding crushing plate.

Fig. 11 is a view of the inner surface of the crushing plates, showing alternate spikes and recesses for aiding disruption of the solidified juice, arranged so that the spikes in one surface will engage the recesses in the other.

Fig. 12 is a view in front sectional elevation of a modification of the structure shown in Figs. 9 and 10, wherein the crushing means includes a pair of movable plates actuated by a reverse screw and the heating element is in the shape of a cone.

Fig. 13 is a view in front sectional elevation of the structure shown in Fig. 12 wherein the comminuting means comprises a common type of ice shaving machine associated with the heating means of Fig. 12.

While my method contemplates the well known agency of heat as a means for melting the frozen juices, I make use of such agency in a manner calculated to reduce the frozen juices in a comparatively short period of time. My method in general contemplates bringing the juices in contact with a surface heated preferably by an electrical resistance adapted to impart to the surface a heat of intensity sufficient to rapidly melt the juices upon coming in contact therewith. While I have found in some cases that heat alone applied in the manner just suggested is sufficient to efficiently melt the juices, I prefer to associate comminuting means with the heated surface for the purpose of breaking up the solidified juices into small particles so that the heat may more readily transform the juices from solid into liquid form. Such comminuting means may be in the form of a crusher, grinder, shaver or any other instrumentality adapted to shatter a solid mass of a frozen liquid. The selection of a particular comminuting means will depend mainly on the size and shape into which a frozen juice has been molded. For use at soda fountains and in the home, for which the juice will be frozen into small cubes or cakes of a size adapted to make a single glass of liquid, I have found that a pair of oppositely disposed plates may be effectively used for breaking up the mass of the solidified juices. I have in the accompanying drawings illustrated several forms of apparatus including the combination of comminuting means and liquefying means, one form comprising a pair of crushing plates with heating means integral therewith so that the desired reduction is effected in one step. In the second general type of apparatus illustrated in the drawings, I have shown separate heating and comminuting means whereby the two means are so associated that the frozen juices are first comminuted and then passed into contact with the heating means, whereby they are reduced either to a liquid or, if desirable, by proper arrangement of a heated surface or surfaces, they may be adapted to contact only momentarily therewith so that the heat imparted to them is sufficient to reduce them to a frozen mush without causing any substantial portion of them to be liquefied.

While my methods may involve the application of heat to the juices for a time sufficient to reduce them to a liquid of substantially the same temperature as they had when they were in the solid form (such treatment being adapted to produce a chilled drink without the necessity of introducing ice therein) it is also within my inventive concept to so construct the heating means that it will be possible not only to heat the juices sufficiently to cause them to change into liquid state, but to retain the juices in contact with the heating means for a time sufficient to allow them to reach any desired temperature. This last procedure will be followed in a case, for example, where it is desired to produce heated milk directly from a frozen cake of milk. This general discussion of the means adapted to carry out my method will make it evident that the essence of my invention resides in the rapid reduction of the frozen juices. I have found with an apparatus such as described that it is possible to reduce a cube adapted to make four ounces of liquid within fifteen seconds.

Referring now to the accompanying drawings, numeral 10 in Fig. 1 is used to designate as a whole a preferred form of my frozen juice reducing apparatus, adapted to be used for the liquefaction of small cubes or cakes. While my device may be mounted in any convenient manner, I have shown here a support 12 attached to a base 13. The base 13 has a recess 14 in its top side adapted to receive a glass into which the juice is passed after being reduced between the plates through the agency of a spout which, as shown by 21, may be formed integrally with the plate 15. The reducing apparatus 10 includes a pair of oppositely disposed plates 15 and 16, the plate 16 having rollers, such as shown by 17, adapted to engage guide rails 18, whereby the plate 16 may be moved to or from the plate 15, thus allowing a cake of frozen juice to be inserted between the adjacent faces of the two plates. I have also shown means for urging the two plates towards each other so that the cake between the two plates will be crushed. Although any convenient means may be used for urging the plates together, I have illustrated in the drawings springs, such as 19, whose respective ends are secured to the sides of the two plates. It will thus be evident that the form of apparatus just described will be well adapted to compress or crush a cake of frozen juice. In such plates I have provided heating elements such as indicated by 20 in Fig. 8, said heating elements being designed to impart a heat to the inner surfaces of the plates sufficient to rapidly melt the frozen juices upon being introduced into contact with the heated surfaces.

In Fig. 2 I have shown a top view of the plate 16.

In Fig. 3 I have shown a detail view of the combined heating and compressing apparatus shown in Fig. 1. I have here shown a knob or handle 22 in connection with the outer plate 16, whereby the plates may be separated for the purpose of introducing a cake of ice therebetween. It is to be understood, however, that any convenient means may be employed for saparating the plates.

In Fig. 4 I have shown a top end view of the heated plates illustrating in particular the sliding surfaces 23 and 24 of the plates 15 and 16 respectively. I have found that the surfaces of plates, after being used for reducing a considerable number of frozen cakes, tend to become sticky due to the deposition of a portion of the juices thereupon. It therefore becomes highly desirable to provide the heating plates with removable surfaces in order that the same may be disengaged from the main body of the plates for the purpose of washing them. Although any convenient means may be used for retaining the faces in association with the bodies of the plates, I have found that plates formed with locking ribs such as 25 which are adapted to engage a corresponding recess 26 in the body of the plates so that the removable face may be slid off of the plate by any convenient means such as a handle 27, may be desirable.

In Fig. 5 I have shown a view of the ends of the heated plates showing channels 28 in the removable faces of the plates adapted to carry off the juices after they are reduced. I have further shown pins, such as 29, located at the lower end of the removable face adapted to uphold a cake of frozen juice against sliding out from between the plates during reduction. As will be evident from the drawings, the pins in one plate are adapted to engage recesses in the opposite plate so that it is possible to bring the plates completely together, thereby insuring complete reduction of the frozen juices.

In Figs. 6 and 7, I have shown corresponding views of the inner surfaces of the plates 15 and 16 illustrating the general arrangement of the removable faces with the bodies of the plates. Reference numeral 30 indicates a stop in connection with the lower end of the recess 26 against which seats the end of the locking rib 25 associated with the removable face, said stop 30 being adapted to properly locate the face with respect to the body of the plate. In these figures I have also shown channels, such as 31, in the surfaces of the removable plates adapted to carry off the frozen juices from contact with the plates after they are reduced to liquid state. As more clearly shown in Fig. 8, the channels 31 increase in depth as well as in width towards the bottom of the faces. The purpose of such a construction is not only to conduct off the juices as they are liquefied, but further to present an irregular heated surface to a cake of frozen juice which, when urged against a cake of frozen juice, will more readily tend to break it up into smaller pieces so that the heat may more quickly influence the reduction of the juice to liquid form. While I have shown a face provided with channels, any convenient form of surface may be used, adapted to such a purpose. The channeled type of plate such as shown has the further advantage that it is adapted to be used for reducing only a portion of the solidified juices to liquid form, leaving in a semi-frozen state a portion of the juices which may be introduced into a liquefied portion for the purpose of keeping them chilled, thus avoiding the necessity of introducing ice. It will be evident when such type of plates are used that after a substantial portion of the juices have become liquefied and passed out of contact with the plates, the remaining unliquefied portion will slide past the pins 29 shown in Fig. 6 out of contact with the plates.

In Fig. 8 it will be seen that the removable faces 23 of the combined heating and comminuting means are relatively thin as compared with the main body of the plates 15 and 16. Such a construction enables the faces to be removed and washed, which of course will cool said faces, and then to be returned to association with the plates and quickly reheated.

In Figs. 9 and 10, I have shown two views of a modified form of apparatus including a comminuting means and a heating means, wherein the comminuter consists of a pair of crushing plates 32 and 33, said plate 32 being stationary with respect to a support 34 and the plate 33 being adapted to slide along a track 35 in the support 34. A crank operated screw 36 supported at 37 in the support 34 is used to urge the plate 33 towards the plate 32. In the inner surfaces of the plates 32 and 33, I have provided a series of spikes 38 which as shown in Fig. 11 are positioned so as to engage corresponding recesses 39 in the respective plates, thereby enabling the two plates to be brought together, whereby complete disintegration or comminution of a cake of frozen juice disposed between the two plates is readily effected. Disposed below said crushing plates in a casing 40, I have provided a heating means comprising a plurality of heated wedges 41. It will be clear that a cake of frozen juice on being comminuted will pass in the form of a snow into contact with the heating plates 41. Due to the small space between the respective heating plates or wedges at their lower extremities, the comminuted frozen juices will be retained in contact with the heating surfaces until they have reached a liquefied state. They will then be carried by a hopper 42 out of contact with the heating plates and into a glass or other container in which it is desired to collect the juices. Although a substantial portion of the juices will be liquefied by coming in contact with the heated surfaces or wedges 41, I have allowed a sufficient distance between the several heating wedges so that a portion of the juices may pass down through the hopper 42 before said portion has been liquefied, and it may then be introduced into the liquefied juices to compensate the same for heat absorbed in changing from solid to liquid state and for the further purpose of maintaining the juices in a chilled condition.

In Fig. 12, I have shown an apparatus similar to the form shown in Figs. 9 and 10. In the present construction, the crushing plates 43 and 44, corresponding to the plates 32 and 33 in Fig. 9, are both movable in a supporting frame 45, being urged towards each other by a reverse screw 46 operated by a handle 47 on a weighted wheel 48. The heating means in the present construction comprises a heated cone 49 in a suitable casing 50.

In Fig. 13 I have shown a somewhat different construction falling within my inventive concept in which the comminuting means comprises a well known type of ice shaver 51 which is adapted to reduce the frozen juices to a snow. Located below the shaver is a casing 52 in which is positioned a heating element 53 which is in the drawings shown as a heated cone similar to that shown in Fig. 12. It is to be understood, however, that a heating element of any desired form may be used in connection with this device.

From the above description, it will be apparent that I have provided several forms of apparatus including a comminuting means and a heating means, adapted to carry out my method of reducing frozen juices either to a liquefied state where it is desirable to produce a chilled drink, or to a state wherein a portion of the juices have been liquefied and the remaining portion maintained in a semi-frozen state for the purpose of keeping the liquefied portion in a chilled condition. By a slight modification in the design of the heating means, it will be seen that my apparatuses may be used for reducing the frozen juices to a mush state without liquefying more than a small proportion of the juices where it is desirable to reduce the juices to a state where they may be dispensed as a substitute for sherbet. Also, if it is desired to serve a hot drink or a drink of any predetermined temperature, the apparatus may be so designed as to retain the liquid in contact with the heating means for a length of time sufficient to raise the liquid to the desired temperature. This arrangement will be particularly useful when frozen milk is reduced to liquid form and is to be served hot or merely warm.

Although no form of apparatus has been shown adapted to reduce frozen juices which have been frozen into a cake of considerable size, it is to be understood that I may readily reduce such a cake according to my method by the use of properly designed comminuting means and heating means associated in a manner similar to that shown in the drawings in connection with an apparatus adapted to reduce small cakes of frozen juices.

What I claim is:

1. The method of liquefying frozen liquids which consists in simultaneously comminuting the solidified liquids and subjecting them to heat for the purpose of causing liquefaction, and immediately thereupon removing the liquids from the heat zone to avoid materially raising their temperature.

2. The method of reducing frozen liquid material to a cold liquid body which consists in subjecting the same to a crushing force and heat of an intensity sufficient to cause rapid liquefaction thereof and maintaining the material subject to the heat for the purpose of and during the producing of an increasing quantity of liquid, the material immediately as it liquefies being removed from the zone of heat to avoid materially raising its temperature.

3. The method of reducing frozen liquid material to a cold liquid body which consists in subjecting the same to pressure and heat of an intensity sufficient to cause rapid liquefaction thereof and maintaining the material subject to the heat for the purpose of and during the producing of an increasing quantity of liquid, the material immediately as it liquefies being removed from the zone of heat to avoid materially raising its temperature.

4. The method of reducing frozen liquid material to a cold liquid body which consists in subjecting the material to pressure and simultaneously therewith subjecting the same to heat for the purpose of causing liquefaction, and immediately thereupon removing the liquefied material from the heat zone to avoid materially raising its temperature.

5. The method of reducing frozen liquid material to produce a cold liquid body which consists in subjecting the same to a crushing force and heat of intensity sufficient to cause rapid liquefaction, maintaining the material subject to the heat until a substantial portion thereof has been liquefied, removing the liquefied material immediately as it liquefies from the zone of heat to avoid materially raising its temperature and removing the remaining frozen material from the zone of heat before liquefaction and introducing the same into the liquefied material to compensate the same for heat absorbed in changing from solid to liquid state.

6. The method of reducing frozen liquid material to produce a cold liquid body which consists in comminuting the same and subjecting it to heat of intensity sufficient to cause rapid liquefaction, removing a portion of the material from the zone of heat as it liquefies, removing the remaining portion of the material before liquefaction, and introducing the last mentioned portion into the liquefied portion to compensate the same for heat absorbed in changing from solid to liquid state.

7. The method of reducing a frozen liquid material to a cold liquid body which includes introducing the material between opposed surfaces heated to an intensity sufficient to cause rapid liquefaction thereof and maintaining the same subject to such heat for the purpose of and during the producing of an increasing quantity of liquid, substantial surface portions of the frozen material being simultaneously maintained subject to the heat of the opposing surfaces to provide a rapid rate of liquefaction and minimize the period during which the material as a whole need be subject to heat, the liquefied material immediately as it liquefies being removed from the zone of heat to avoid materially raising its temperature.

8. The method of reducing a frozen liquid material to a cold liquid body which includes subjecting the material to contact with a solid surface of area at least as great as that of the material heated to an intensity sufficient to cause rapid liquefaction thereof, and maintaining the same subject to such heat for the purpose of and during the producing of an increasing quantity of liquid, substantial surface portions of the frozen material being simultaneously maintained in contact with the heated surface to provide a rapid rate of liquefaction and minimize the period during which the liquid as a whole shall be subject to heat, the liquefied material immediately as it liquefies being removed from the zone of heat to avoid raising its temperature.

9. The method of reducing frozen liquid material to produce a cold liquid body which includes subjecting the material to contact with a solid surface area greater than the area of the material to cause rapid liquefaction thereof, substantial surface portions of the frozen material being simultaneously maintained in contact with the heated surface to provide a rapid rate of liquefaction and minimize the period during which the material as a whole shall be subject to heat, maintaining the frozen material subject to such heat until a substantial portion thereof has been liquefied, removing the liquefied material immediately as it liquefies from the zone of heat to avoid materially raising its temperature, and removing the remaining unliquefied portion while still in a frozen state and immersing it in the liquefied material to compensate the same for heat absorbed in changing from solid to liquid state.

JOE C. JENKINS.